United States Patent [19]
Bargerhuff et al.

[11] Patent Number: 5,272,690
[45] Date of Patent: Dec. 21, 1993

[54] HOLOGRAM ELEMENT SYSTEM

[75] Inventors: Richard A. Bargerhuff; LeRoy D. Dickson, both of Morgan Hill; Matthias C. Krantz, San Jose, all of Calif.

[73] Assignee: International Business Machines Corporation, Armonk, N.Y.

[21] Appl. No.: 846,648

[22] Filed: Mar. 5, 1992

[51] Int. Cl.$^5$ ............................................... G02B 5/32
[52] U.S. Cl. .................................. 369/112; 369/44.37; 359/15; 359/19
[58] Field of Search ............... 369/112, 44.37; 359/15, 359/19, 17, 18

[56] References Cited

U.S. PATENT DOCUMENTS

| | | | |
|---|---|---|---|
| 3,767,310 | 10/1973 | Dickson | 356/218 |
| 4,497,534 | 2/1985 | Sincerbox | 359/19 |
| 4,644,160 | 2/1987 | Arimoto et al. | 250/201 |
| 4,679,184 | 7/1987 | Yoshida et al. | 369/112 |
| 4,681,394 | 7/1987 | Noguchi et al. | 350/6.6 |
| 4,701,005 | 10/1987 | Noguchi et al. | 350/3.7 |

FOREIGN PATENT DOCUMENTS

| | | |
|---|---|---|
| 0266841 | 4/1987 | European Pat. Off. |
| 0441435 | 4/1991 | European Pat. Off. |
| 59-245767 | 11/1984 | Japan |
| 61-42613 | 3/1986 | Japan |
| 61-60831 | 3/1986 | Japan |
| 61-168504 | 7/1986 | Japan |
| 62-169461 | 7/1987 | Japan |
| 62-209934 | 8/1987 | Japan |
| 62-212603 | 8/1987 | Japan |
| 62-212604 | 8/1987 | Japan |
| 62-212606 | 8/1987 | Japan |
| 62-243488 | 9/1987 | Japan |
| 62-243489 | 9/1987 | Japan |
| 63-026604 | 4/1988 | Japan |
| 1053056 | 11/1983 | U.S.S.R. |
| 2059664 | 9/1980 | United Kingdom |
| 2109583 | 11/1982 | United Kingdom |

*Primary Examiner*—Constantine Hannaher
*Assistant Examiner*—Jim Beyer
*Attorney, Agent, or Firm*—Douglas R. Millett

[57] ABSTRACT

A hologram element receives a first and second laser beams at a first angle relative to one another. The hologram element emits the laser beams at a second angle relative to one another. The second angle is less than the first angle. The result is that laser beams from widely divergent laser sources may be directed into the same optical channel. Closely spaced beams are thereby provided for multiple beam optical data storage systems.

16 Claims, 12 Drawing Sheets

HOLOGRAM ELEMENT SYSTEM

BACKGROUND OF THE INVENTION

1. Field of the Invention

The present invention relates generally to volume holograms and more specifically to volume holograms for use in optical data storage systems.

2. Description of the Prior Art

Magneto-optic recording allows the erasable storage of data. A write laser beam is focussed onto a spot on the medium and heats the magneto-optic material to a temperature at which the magnetization of the magnetic domains of the medium may be changed. This is known as the Curie temperature. A magnetic field is applied in one of two directions to orient the magnetic domain of the spot in either an upward or downward direction.

The disk is read by focussing a polarized read laser beam onto the magneto-optic material. The read laser beam has a lower power level than the write laser beam and does not heat the medium to the Curie temperature. The Kerr effect causes the plane of polarization of the beam of light reflected from the medium to be rotated either clockwise or counter-clockwise depending on whether the spot has an upward or downward magnetic orientation. The difference in rotation is then detected and represents the recorded data.

The typical system uses one laser with variable power to do both writing and reading. In order to verify the data recorded, the disk must be rotated almost three times for each track recorded. One and a half revolutions are required on average to seek and write the track and a second revolution is required to read and verify the track just written.

In order to speed up the recording process, direct read after write (DRAW) systems have been proposed. These systems comprise two lasers; one laser (the read/write laser) to write a track and a second laser (the DRAW laser) to read the track directly after it has been written. Thus, the DRAW system requires only one and one half revolutions on average to write and verify a track on the disk. The read/write laser alone is used to read the disk when no writing is being performed.

Another type of optical data storage system uses multiple beams to read and record several parallel tracks at once. The beams are focussed onto separate tracks of the optical disk. The optical channel receives a reflected beam from each of the tracks and generates a data signal responsive thereto. Data may be recorded and read much faster in this parallel manner.

A problem with both the DRAW and parallel track systems is that the individual beams must be closely spaced in order to use the same optical channel. Typically it is desired that the two beams be offset from one another at an angle of five degrees or less. The beams are generated by separate laser sources and it may not be possible to position the laser sources close enough together in order to achieve the small spacing of the beams. What is needed is a system which combines two widely divergent beams from separate laser sources into two closely spaced beams which have a small angle of deviation.

SUMMARY OF THE INVENTION

In accordance with the invention, a first and a second laser generate a first and a second laser beam, respectively. The first and second laser beams have a first angle of deviation relative to one another. A volume hologram element receives the first and second laser beams and transmits the first and second laser beams with a second deviation angle with respect to one another. The second deviation angle is much less than the first deviation angle. The first and second laser beams may then be used in a multiple beam optical data storage system.

For a fuller understanding of the nature and advantages of the present invention, reference should be made to the following detailed description taken in conjunction with the accompanying drawings.

DESCRIPTION OF THE PREFERRED EMBODIMENTS

Figure 1:
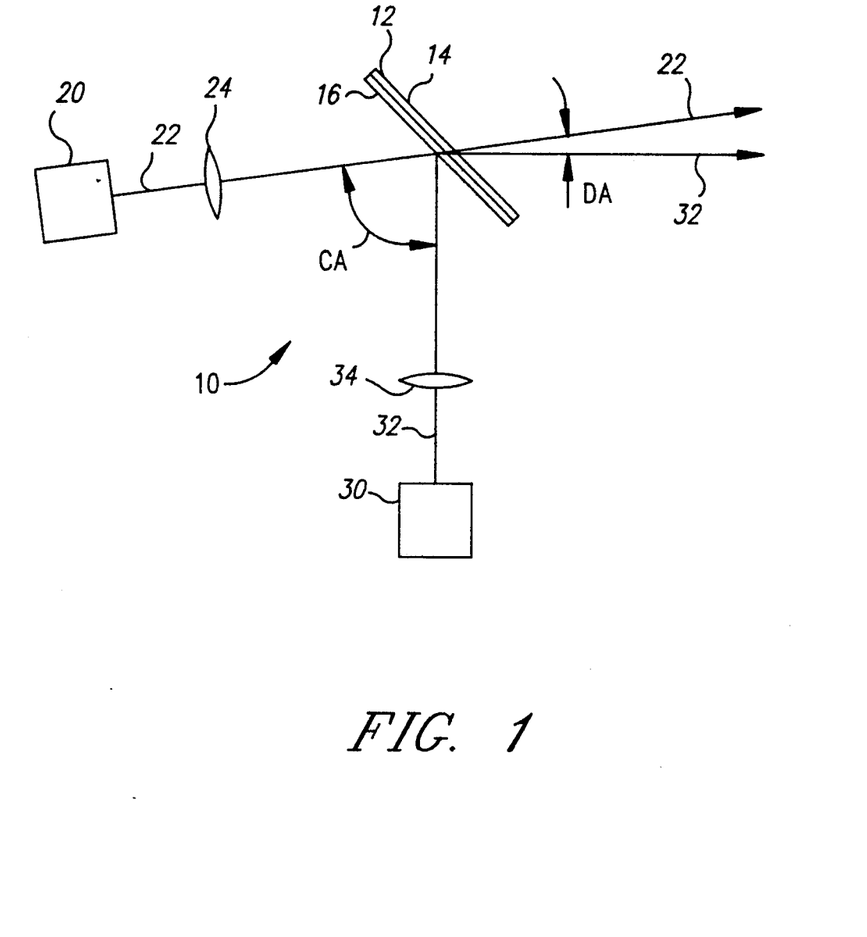
FIG. 1 is a schematic diagram of a hologram system of the present invention.

FIG. 1 shows a hologram system of the present invention and is designated by the general reference number 10. System 10 comprises a hologram element 12. Element 12 comprises a glass substrate 14 and a hologram 16. A laser 20 generates a laser beam 22 which is collimated by a lens 24. A laser 30 generates a laser beam 32 which is collimated by a lens 34. The beams 22 and 32 have a converging angle (CA) with respect to one another. Beam 22 and 32 converge at hologram 16. Beam 32 is incident at hologram 16 at the Bragg angle of hologram 16. Beam 22 is incident at a non-Bragg angle.

Hologram 16 diffracts beam 32 and allows beam 22 to pass undiffracted. The beams 22 and 32 exit hologram element 12 at a diverging angle (DA) with respect to one another. The angle DA is less than the angle CA. The effect is to combine two widely separated beams into two closely spaced beams with small separation angle which may be easily used in optical systems. The initial wide separation allows various types of laser equipment to be used. The DA may be five degrees or less and one degree or less in the preferred embodiment.

Holograms are recordings of light intensity patterns created by the interference of two beams of mutually coherent light (the two beams are usually obtained by splitting a single laser beam during the hologram manufacturing process). In a volume hologram, the interference pattern is recorded as a periodic variation in the refractive index of the material while the thickness of the material remains fixed. The periodic variation in refractive index creates surfaces of peak refractive index within the material. These surfaces are referred to as "Bragg surfaces." When the interference pattern is created by two plane waves or two waves with identical curvature at the hologram surface, the Bragg surfaces will be Bragg planes.

When the hologram is re-illuminated by one of the original beams at an angle that results in maximum diffraction efficiency, the internal angle of the beam relative to the Bragg planes is referred to as the "Bragg angle." The external angle of incidence at which maximum diffraction occurs is also often referred to as the Bragg angle.

Figure 2:
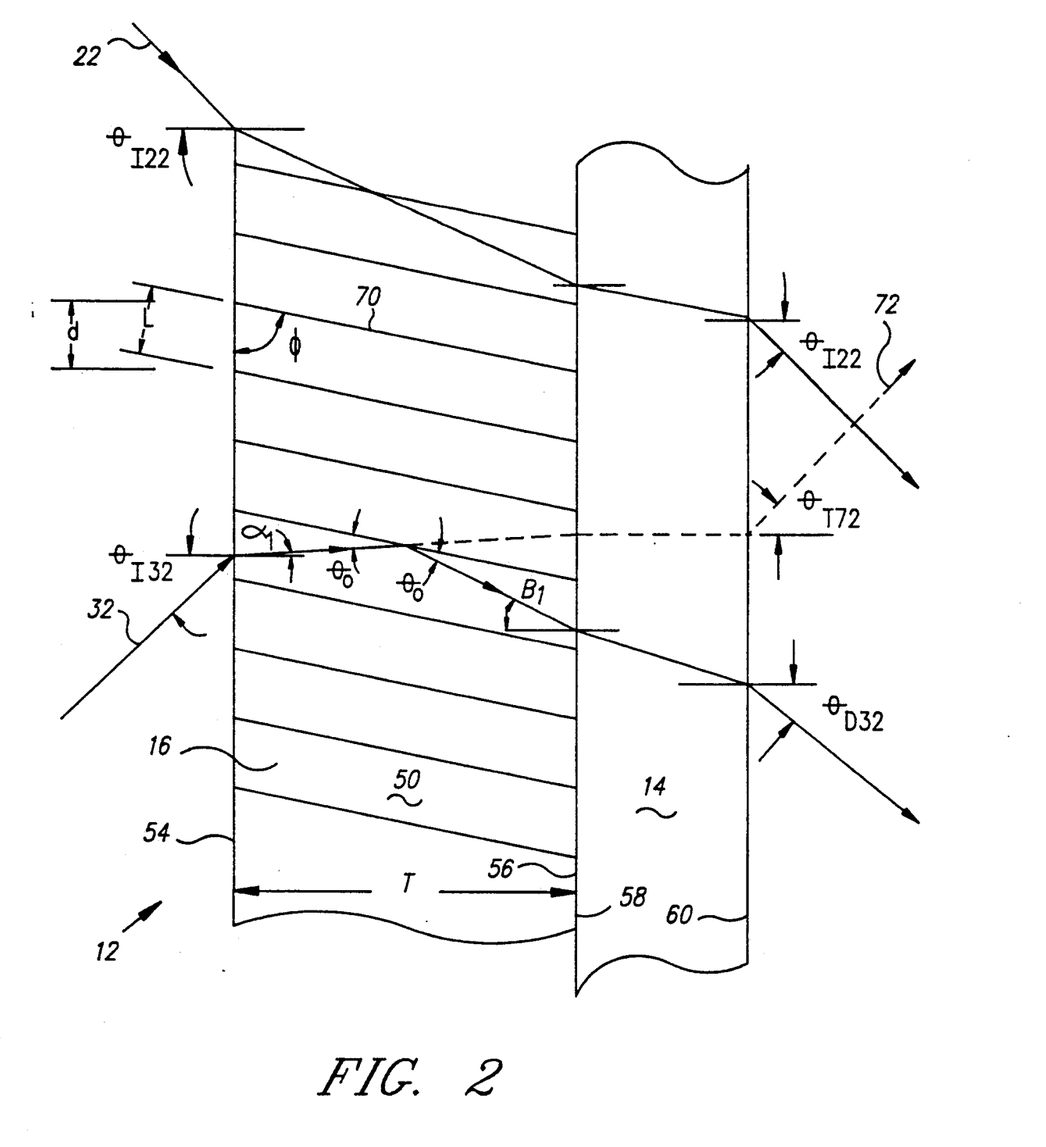
FIG. 2 is a cross-sectional view of a hologram of FIG. 1.

FIG. 2 shows a cross-sectional view of hologram element 12. Hologram 16 comprises a hologram material 50 deposited to a thickness T on substrate 14. The hologram material is preferably dichromated gelatin, although other hologram materials may also be used. Hologram 16 has a surface 54 and 56, and substrate 14 has a surface 58 and 60.

The hologram material 50 has been manufactured with periodic Bragg planes 70. The Bragg planes 70 have a separation distance L, an external fringe spacing distance d and an angle $\phi$ relative to surface 54.

In operation, the beam 32 (having a wavelength $\lambda_1$) enters hologram 16 at surface 54 at an angle $\theta_{I32}$ with respect to the perpendicular. The beam 32 enters the material 50 at an internal incidence angle $\alpha_1$ = asin (sin $\theta_{I32}/n_0$) where $n_0$ is the average index of refraction of material 50 (typically 1.26). This change in angle is due to refraction. A small portion of beam 32 travels through material 50 without experiencing any diffraction and exits substrate 14 as a beam 72 shown as a dotted line. Note that beam 72 experiences some refraction at surfaces 56 and 60. This is because material 50 and substrate 14 have different indices of refraction. Beam 72 exits surface 60 at a transmitted output angle of $\theta_{T72}$. $\theta_{T72}$ is equal to $\theta_{I32}$ and beam 72 will appear to be transmitted through hologram element 12 without diffraction.

The remaining portion of beam 32 is diffracted by the Bragg planes 70. The angle of beam 32 relative to Bragg plane 70 is $\theta_0$ and is equal to asin [$\lambda_1/2n_0L$]. The diffracted beam encounters surface 56 at an internal diffraction angle $\beta_1$. The diffracted beam exits substrate 14 at surface 60. Again, there is some refraction at surfaces 56 and 60. Beam 32 exits surface 60 at a diffracted output angle of $\theta_{D32}$. $\theta_{D32}$ equals asin [$n_0$ sin $\beta_1$]. In the preferred embodiment, hologram 16 is designed such that approximately all of beam 32 is diffracted and beam 72 will not exist. The exact properties of beams 32 and 22 are described in more detail below.

In designing the hologram 16, the following variables are taken into account:
$\theta_I$ = angle of incidence (external).
$\alpha_1$ = angle of incidence (internal).
$\beta_1$ = angle of diffraction (internal).

$\delta$ = deviation from the Bragg angle. Assumed to be equal to zero for beam 32.

$\phi$ = tilt of Bragg planes.
 = $\pi/2$ for no tilt.

L = separation of the Bragg planes.
T = thickness of hologram material.
d = external fringe spacing.
$n_0$ = average refractive index of the hologram medium, typically 1.26 for an exposed and processed dichromated gelatin holographic grating.
$n_1$ = Peak change in index of refraction of the hologram medium. Typically approximately 0.01 for dichromated gelatin as used in the preferred embodiment of this invention.
$\lambda a$ = wavelength of light in air. Here $\lambda a = \lambda_1 = 780$ nm.
$\delta\lambda$ = deviation from $\lambda a$ (Bragg $\lambda$). Assumed to be equal to zero.

These variables are used in the following formulas:

$$\alpha = a\sin\left[\frac{\sin[\theta_1]}{n_0}\right] \quad (1)$$

$$\phi = \frac{\pi}{2} - \frac{\beta - \alpha}{2} \quad (2)$$

$$\theta_0 = \alpha + \frac{\pi}{2} - \phi \quad (3)$$

$$L = \frac{\lambda_a}{2n_0\sin[\theta_0]} \quad (4)$$

$$d = \frac{L}{\sin(\phi)} \quad (5)$$

$$C_R = \cos(\alpha) \quad (6)$$

$$C_S = \cos(\alpha) - \frac{\lambda_a}{n_0 L}\cos(\phi) \quad (7)$$

$$N = \pi n_1 \frac{T}{\lambda_a \sqrt{C_R C_S}} \quad (8)$$

$$\Gamma = 2\pi\delta \frac{\sin[\phi - \theta_0]}{L} - \delta\lambda \frac{\pi}{n_0 L^2} \quad (9)$$

$$S = \Gamma \frac{T}{2C_S} \quad (10)$$

$$E_S = \frac{[\sin[\sqrt{N^2 + S^2}]]^2}{1 + \frac{S^2}{N^2}} \quad (11)$$

$$E_P = \frac{[\sin[\sqrt{[N\cos[2\theta_0]]^2 + S^2}]]^2}{1 + \frac{S^2}{[N\cos[2\theta_0]]^2}} \quad (12)$$

Formulas 11 and 12 above give the diffraction efficiencies for the S and P orthogonal polarization components and determine the conditions of the beams 32 and 72. Es is the diffraction efficiency of the S polarized light component and Ep is the diffraction efficiency of the P polarized light component. The S and P represent the orthogonal polarization components of the light. In the preferred embodiment, beams 22 and 32 contain only S polarized light so that diffraction efficiency for P polarized light may be ignored. A more detailed discussion of hologram physics is given by Herwig Kogelnik in "Coupled Wave Theory for Thick Hologram Gratings," Bell System Technical Journal, Vol. 48, No. 9, p. 2909 (November 1969).

Beam 22 enters hologram 16 at an angle $\theta_{I22}$, is refracted at surfaces 54, 56 and 60 and exits substrate 14 at an angle $\theta_{T22}$. In the preferred embodiment, $\theta_{I22} = \theta_{T22} = 45°$.

In designing the hologram 16, the desired converging angle CA and diverging angle DA are first determined. The specific angles for the hologram 16 are then calculated using the formulas above. Once all of the angles are determined, the thickness of the hologram is selected. The hologram must have a high Bragg angle sensitivity. This means that the hologram will diffract approximately 100 percent of beam 32 which is at the Bragg angle, but will not diffract light which is at an angle slightly off of the Bragg angle (such as beam 22). In other words, the hologram will be highly selective of the angle of the incoming light. This is very important in the present invention where the desired diverging angle between beams 22 and 32 is approximately one degree. If the Bragg angle sensitivity is not high, beam 22 would also be diffracted rather than passed undiffracted as is desired. The desired Bragg angle sensitivity determines the thickness T.

Figure 3:
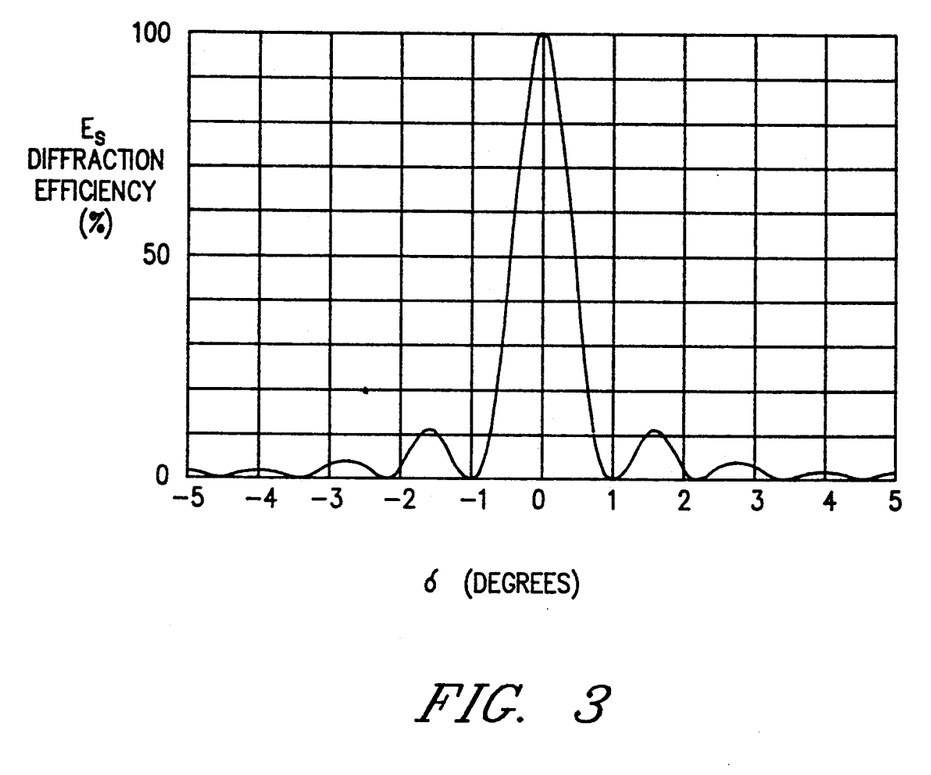
FIG. 3 is a graph of the percent of s-polarized light diffracted versus the deviation from the Bragg angle.

FIG. 3 shows a graph of diffraction efficiency Es versus deviation from the Bragg angle $\delta$ for a hologram having a thickness T=40 microns, $\alpha 1 = 23.38$ degrees, $\beta_1 = 34.81$ degrees, $\theta_{132} = 30.00$ degrees, $\theta_{D\ 32} = 46.00$ degrees, $n_1 = 0.0084$, $n_0 = 1.26$, and $\lambda_a = 780$ nm. The graph is obtained by plotting the Es equation (11). Note that at the Bragg angle ($\delta = 0$), the diffraction efficiency of the S polarized light is 100 percent. At one degree deviation from the Bragg angle ($\delta = \pm 1$) the diffraction efficiency is zero. These are the desired diffraction efficiencies for the beams 32 and 22, respectively, which exit the hologram with DA=one degree of separation. The desired thickness of T=40 microns was obtained by plotting various graphs similar to FIG. 3 having T equal different thicknesses until the thickness having the desired diffraction efficiency was determined. Once the angles and the thickness of the hologram are known, then the exposure parameters are determined as is known in the art.

Figure 4:
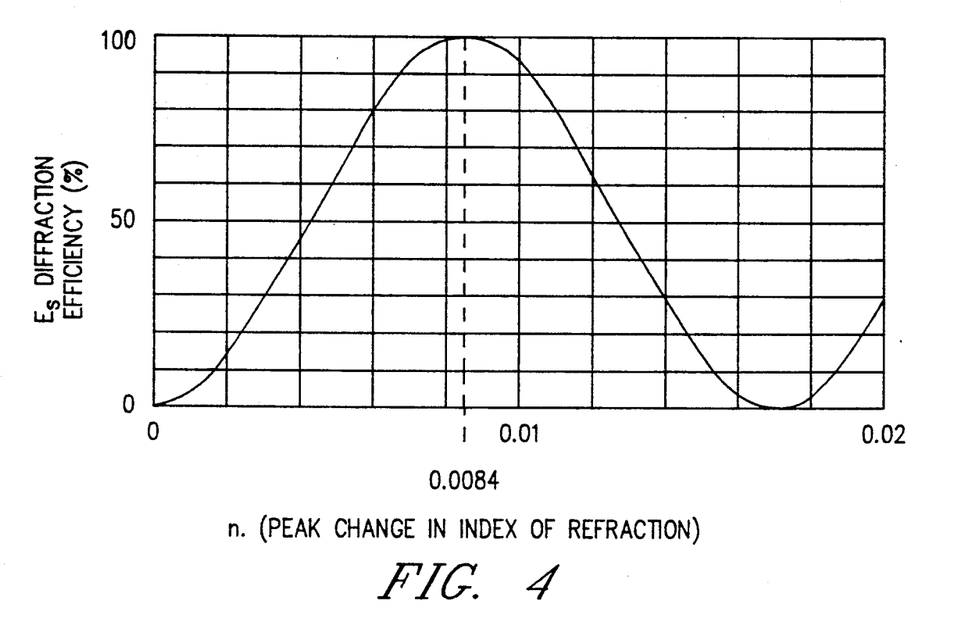
FIG. 4 is a graph of the percent of s-polarized light diffracted versus the peak change in the index of refraction.

FIG. 4 shows a graph of diffraction efficiency Es versus peak change in refractive index $n_1$ for a hologram of T=40 microns, $\alpha 1 = 23.38$ degrees, $\beta 1 = 34.81$ degrees, $n_0 = 1.26$, and $\lambda a = 780$ nm. The value of $n_1$ is determined by the exposure and processing of the hologram as is known in the art. Note that the desired 100 percent Es polarization diffraction efficiency is achieved at an $n_1 = 0.0084$.

Once the thickness T and the desired angles are determined, the hologram is manufactured. In order to record the hologram it is necessary to use a light wave length which will react with the hologram material. In a preferred embodiment, dichromated gelatin is used as the hologram material and a recording wavelength $\lambda_2$ of approximately 488 nanometers is used.

Figure 5:
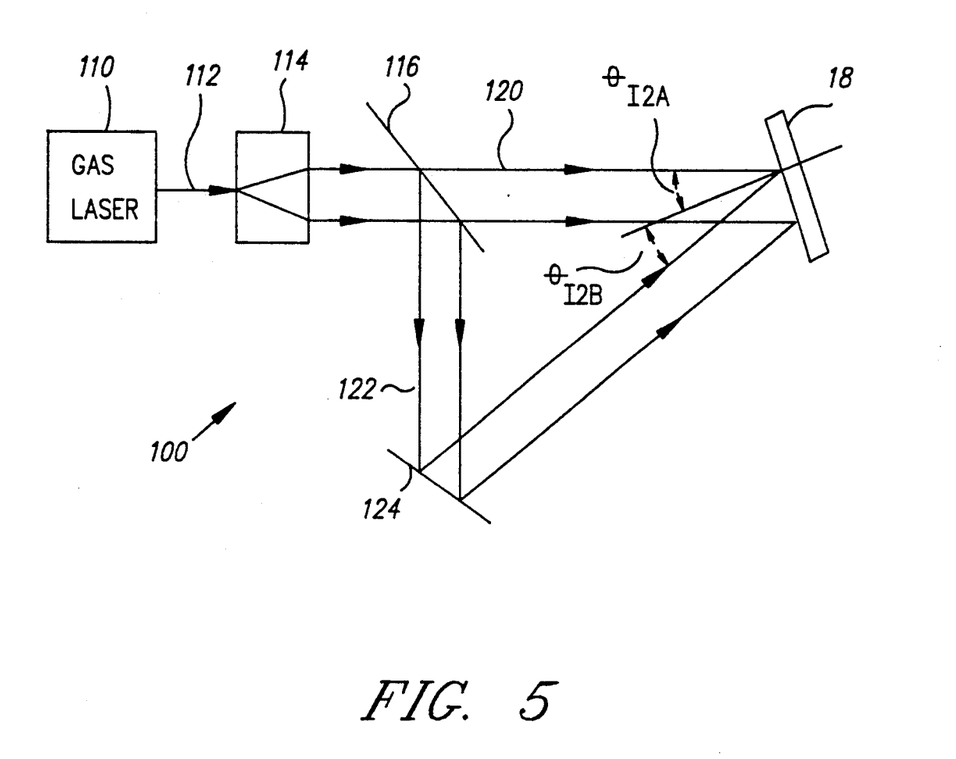
FIG. 5 is a schematic diagram of a system for making the hologram of the present invention.

FIG. 5 shows a schematic diagram of a system for manufacturing the hologram 18 and is designated by the general reference number 100. System 100 has a gas laser 110 which emits a light beam 112 at the recording wavelength $\lambda_2$. Beam 112 is expanded by a beam expander 114. A beamsplitter 116 splits beam 112 into an object beam 120 and an image beam 122. Beam 122 is reflected by a mirror 124 to hologram 18. Beams 120 and 122 intersect at the hologram 18 at recording external incident angles of $\theta_{12A}$ and $\theta_{12B}$. The angles $\theta_{12A}$ and $\theta_{12B}$ are determined by the conditions of the desired hologram (L, $\phi$) as described above. The recording internal angles of incidence are $\alpha_{2A} = \phi - \pi/2 - \operatorname{asin}[\lambda_2/2n_0L]$ and $\alpha_{2B} = \phi - \pi/2 + \operatorname{asin}[\lambda_2/2n_0L]$. From Snells Law, $\theta_{12A} = \operatorname{asin}[n_0 \sin \alpha_{2A}]$ and $\theta_{12B} = \operatorname{asin}[n_0 \sin \alpha_{2B}]$. The hologram material 50 of hologram 18 is thereby exposed to light of $\lambda_2$ at angles $\theta_{12A}$ and $\theta_{12B}$. The result is that the desired Bragg planes are recorded into the film.

Figure 6:
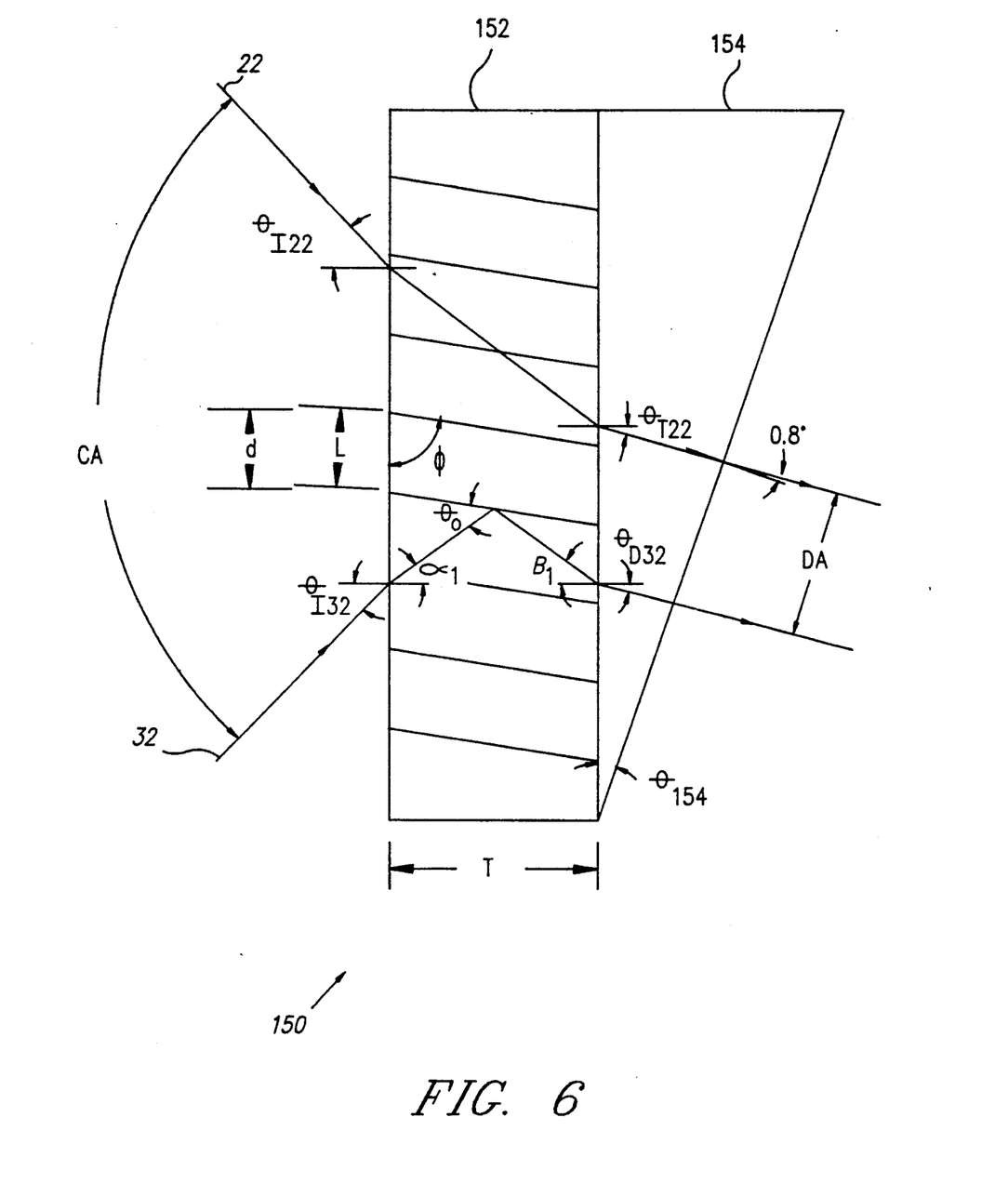
FIG. 6 is a cross-sectional view of an alternative embodiment of the hologram element of the present invention.

FIG. 6 shows an alternative embodiment of the hologram element and is designated by the general reference number 150. Element 150 comprises a hologram 152 deposited on a prism 154. Prism 154 is preferably of glass having an index of refraction $n_p = 1.6$ at an angle of $\theta_{154}$. Hologram 152 is preferably made of dichromated gelatin.

The addition of prism 154 increases the Bragg angle sensitivity of hologram 152. This allows the diverging angle DA to be even less than 1 degree. This is achieved by the additional refraction at the surface between prism 154 and hologram 152. The prism is then oriented such that both beams pass out of prism 154 approximately perpendicular to the surface. Once the desired angles are selected, the manufacture of the hologram 152 is similar to that described above.

In a preferred embodiment T=40 microns, $\phi = 90.00$ degrees, $\alpha_1 = 34.14$ degrees, $\beta_1 = 34.14$ degrees, $\theta_{132} = 45.00$ degrees, $\theta_{D32} = 26.23$ degrees, $\theta_{122} = 44.00$ degrees, $\theta_{T22} = 25.73$ degrees, $\theta_{154} = 26.23$ degrees, $n_1 = 0.0084$, $n_0 = 1.26$, and $\lambda_a = 780$ mm. The resulting converging angle between the beams is CA=89.00 degrees and the resulting diverging angle is DA=0.80 degrees.

The prism 154 may also be used where it is desired to use a thinner hologram 152. For example, hologram element 12 described above required a thickness of 40 microns to achieve a DA equal to 1 degree. Hologram element 150 with prism 154 can obtain the same DA of 1 degree with a hologram of only 32 microns in thickness. The calculation of the angles and the manufacture of such a hologram element is the same as described above.

Figure 7:
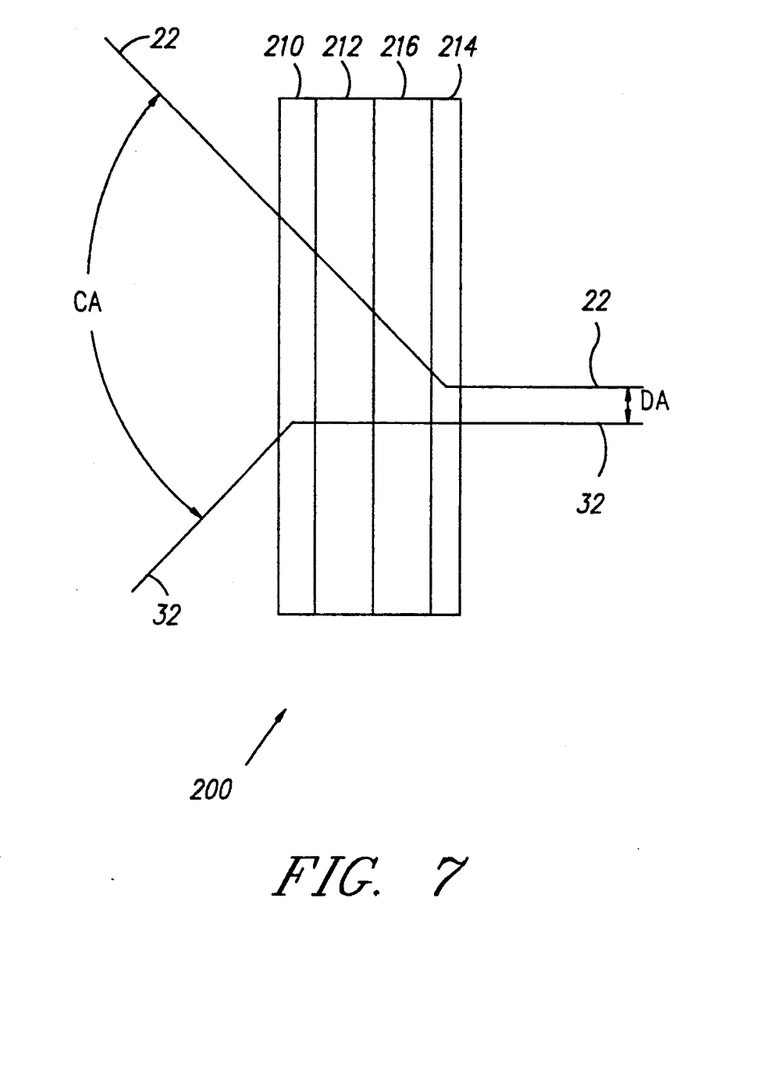
FIG. 7 is a cross-sectional view of an alternative embodiment of the hologram element of the present invention.

FIG. 7 shows a schematic of an alternative embodiment of the hologram element and is designated by the general reference number 200. Element 200 comprises a hologram 210 deposited on a substrate 212 and a hologram 214 deposited on a substrate 216. The substrates are then glued together with an optical cement. Hologram 210 and 214 are preferably made of dichromated gelatin and substrates 212 and 216 are preferably made of glass.

In element 200, beam 32 is diffracted at hologram 210 and then passes through hologram 214 undiffracted. Beam 22 passes undiffracted through hologram 210 and then is diffracted at hologram 214. Each hologram contributes a portion of the angle change between beams. The design and manufacture of the hologram is the same as that described above for hologram 16. In a preferred embodiment, CA=94.00 degrees, and DA=2.00 degrees. For hologram 210, $\theta_{T22} = 45.00$ degrees, $\theta_{T22} = 45.00$ degrees, $\theta_{I32} = 49.00$ degrees, $\theta_{D32} = 2.00$ degrees, $\alpha_1 = 36.80$ degrees, $\beta 1 = 1.59$ degrees, and $n_1 = 0.0089$, T=40 microns. For hologram 214, $\theta_{I22} = 45.00$ degrees, $\theta_{D22} = 0.00$ degrees, $\theta_{I32} = 2.00$ degrees, $\theta_{T32} = 2.00$ degrees, $\alpha 1 = 34.14$ degrees, $\beta 1 = 0.00$ degrees, and $n_1 = 0.0089$, and T=40 microns.

Figure 8:
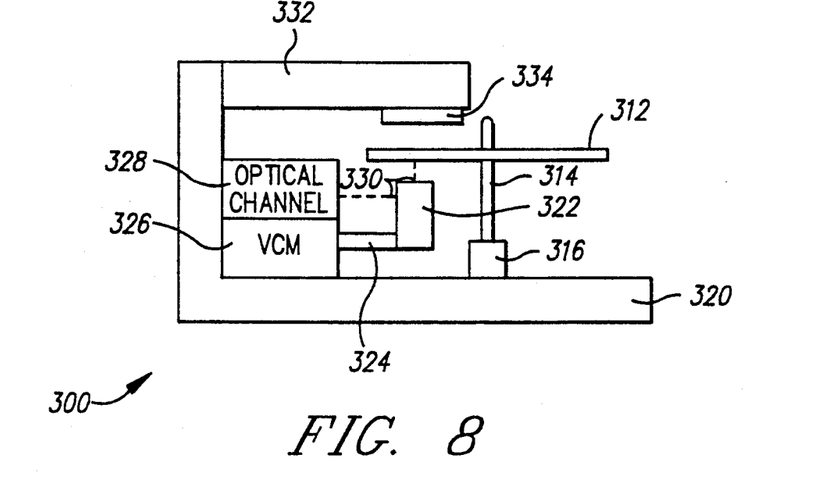
FIG. 8 is schematic diagram of an optical data storage system of the present invention.

FIG. 8 shows a schematic diagram of a DRAW optical data storage system of the present invention and is designated by the general reference number 300. System 300 includes an optical data storage disk 312. Disk 312 is preferably a magneto-optic (MO) type of disk. Disk 312 is mounted on a spindle 314 which is attached to a spindle motor 316. Motor 316 is attached to a system chassis 320. Motor 316 rotates spindle 314 and disk 312.

An optical head 322 is positioned below disk 312. Head 322 is attached to an arm 324 which in turn is connected to a voice coil motor 326. Motor 326 is attached to chassis 320 and moves arm 324 and head 322 in a radial direction below disk 312. A dashed line 330 shows the path of light from an optical channel 328 to head 322, disk 312 and back. A magnet arm 332 is connected to chassis 320 and extends over disk 312. A bias magnet 334 is mounted to arm 332.

Figure 9:
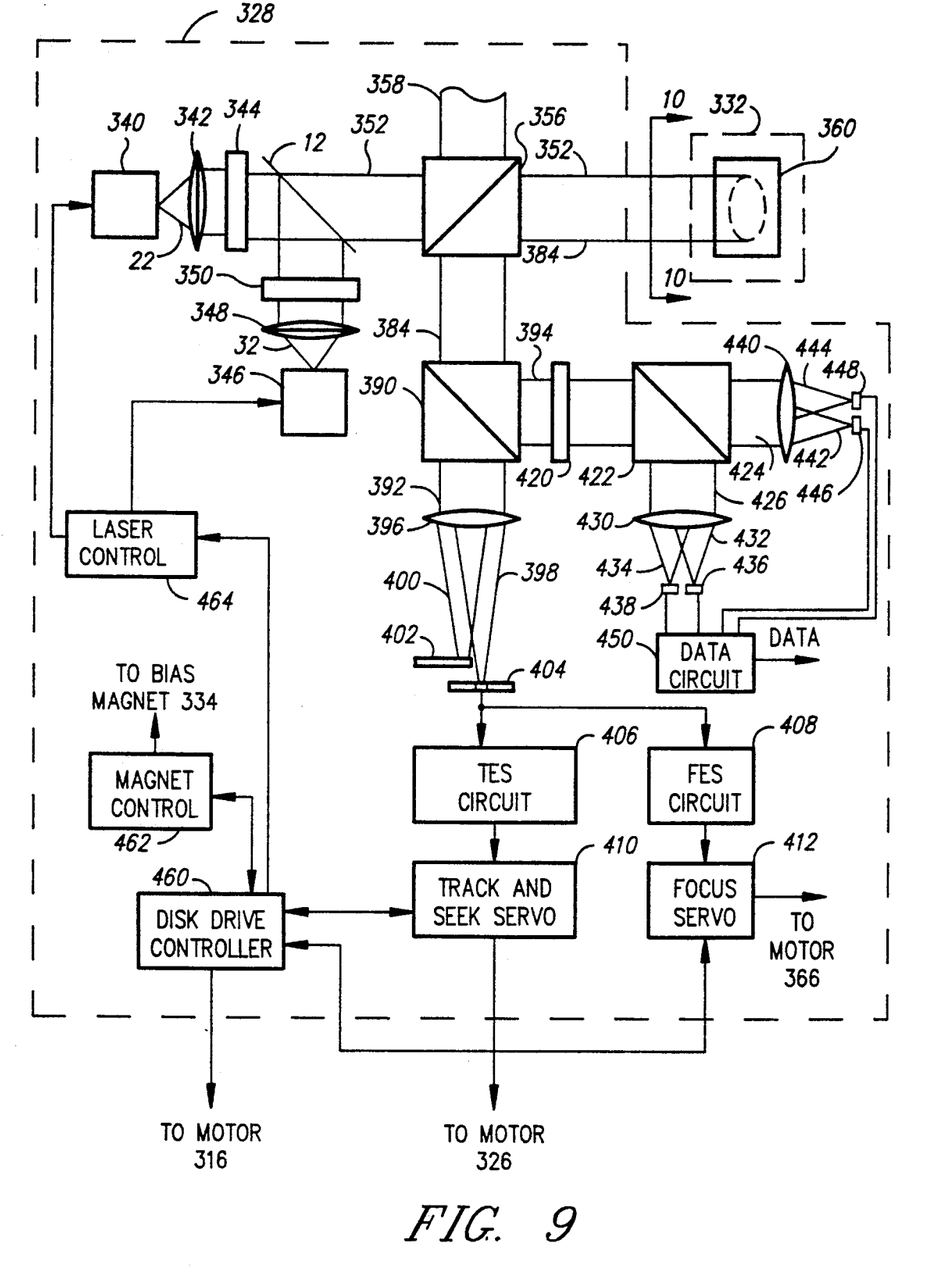
FIG. 9 is a schematic diagram of a portion of the drive of FIG. 8.

FIG. 9 shows a schematic diagram of optical channel 328 of FIG. 8. A laser 340 produces an S polarized read/write (R/W) beam 22 which is collimated by a lens 342 and circularized by a circularizer 344, such as a prism. A laser 346 produces a S polarized direct read after write (DRAW) beam 32 which is collimated by a lens 348 and circularized by a circularizer 350, such as a prism. Beams 22 and 32 converge at hologram 12 and are redirected as described above. They now overlap and diverge from one another at a very small angle. The overlapping beams 22 and 32 will be referred to as a transmission beam 352. Beam 352 passes to a beamsplitter 356. A portion of beam 352 is directed away from beamsplitter 356 as beam 358 and is unused in this embodiment. The remaining portion of beam 352 passes to the optical head 322. Head 322 has a beam bender mirror 360 oriented at a forty-five degree angle such that beam 352 is directed upward and out of the surface of the page of FIG. 9.

Figure 10:
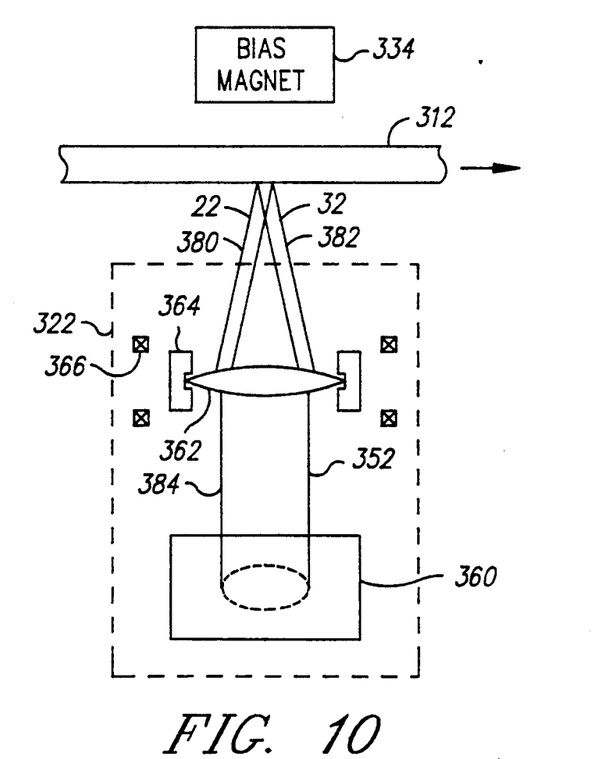
FIG. 10 is a schematic diagram of a portion of the drive of FIG. 8.

FIG. 10 shows a side view of the optical head 322 from the perspective shown by the arrows in FIG. 9. The beam 352 is directed upwards from mirror 360 to a lens 362. Lens 362 is located in a holder 364 which is attached to a voice coil motor 366. Motor 366 moves lens 362 vertically up or down in order to focus the light onto the disk 312. At lens 362, the light beam 352 is divided back into the R/W beam 22 and the DRAW beam 32. The beams are separated by lens 362 because of their diverging angle with respect to one another.

The beams 22 and 32 focus to the same track of disk 312. As disk 312 rotates in the direction of the arrow, the track is written by beam 22 and then verified by beam 32. Beams 22 and 32 are reflected by disk 312 as a reflected R/W beam 380 and a reflected DRAW beam 382. The overlapping beams 380 and 382 will be referred to as a reflected beam 384. The reflected beam 384 is collimated by lens 362 and is reflected by mirror 360.

See FIG. 9. Beam 384 passes to beamsplitter 356. At beamsplitter 356 a portion of beam 384 is reflected toward a beamsplitter 390. Beamsplitter 390 divides beam 384 into a servo beam 392 and a data beam 394. Servo beam 392 passes to a lens 396 which focuses and divides beam 392 into a R/W component beam 398 and a DRAW component beam 400. A knife edge 402 blocks beam 400. Beam 398 passes to a servo optical detector 404. Detector 404 may be a segmented spot size measuring detector as is known in the art. A tracking error circuit 406 and a focus error circuit 408 are connected to detector 404. Circuit 406 generates a tracking error signal which is used by a track and seek servo 410 to control motor 326 to keep the beams on track. Circuit 408 generates a focus error signal which is used by a focussing servo 412 to control motor 366 to move lens 362 in order to keep the beams focussed on the disk 312.

Data beam 394 passes through a half waveplate 420 to a polarizing beamsplitter 422. Beamsplitter 422 divides beam 394 into orthogonally polarized beams 424 and 426. A lens 430 focuses and divides beam 426 into a R/W component beam 432 and a DRAW component beam 434. Beams 432 and 434 fall upon a pair of optical detectors 436 and 438, respectively. A lens 440 focuses and divides beam 424 into a R/W component beam 442 and a DRAW beam 444. Beams 442 and 444 fall upon a pair of optical detectors 446 and 448, respectively. Detectors 436, 438, 446 and 448 are connected to a data circuit 450.

A disk controller 460, as is known in the art, provides overall system control. Controller 460 is connected to a magnet control 462, a laser control 464, motor 316 and servos 410 and 412 which are known in the art.

Figure 11:
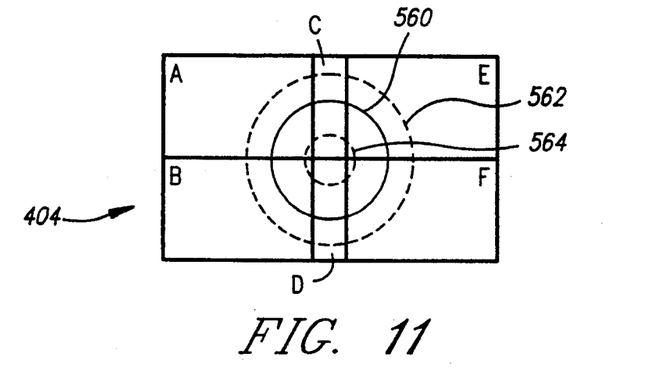
FIG. 11 is a top view of an optical detector of FIG. 9.

FIG. 11 shows a top view of detector 404. Detector 404 is divided into six sections, 404A, B, C, D, E and F.

Figure 12:
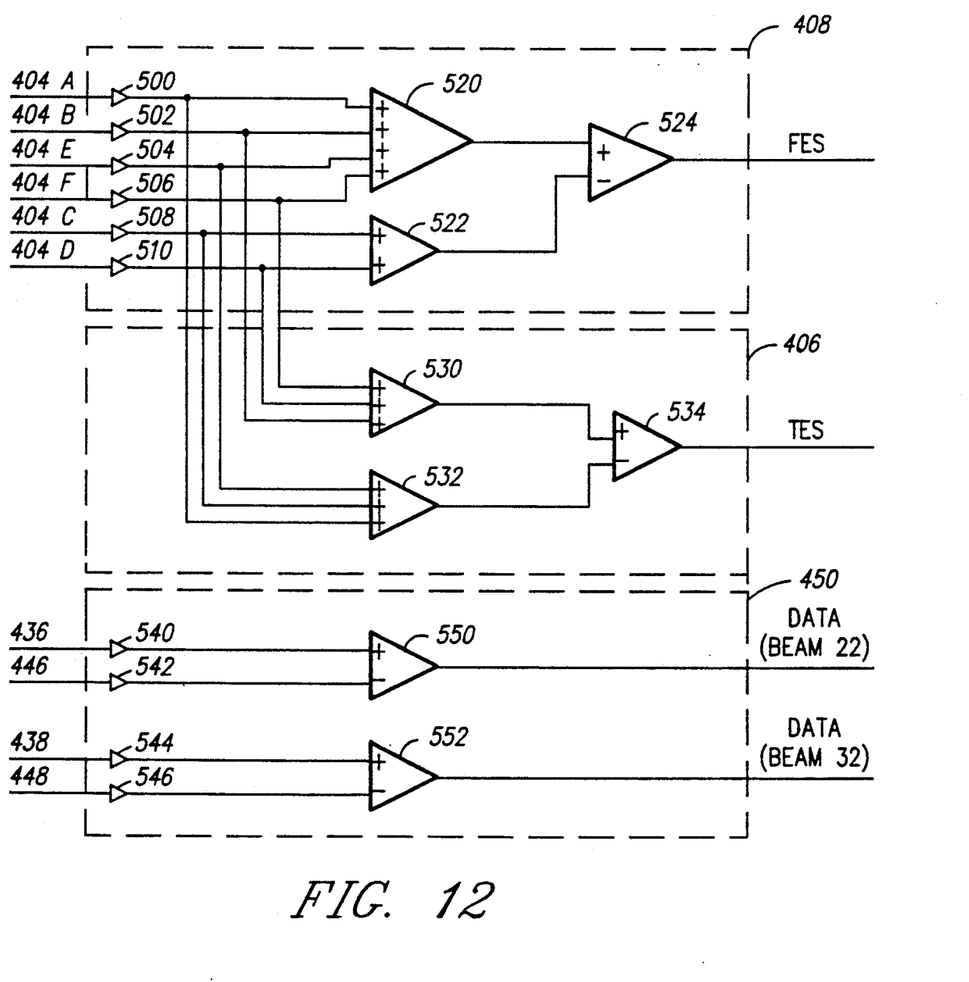
FIG. 12 is a circuit diagram of the TES, FES and data circuits of FIG. 9.

FIG. 12 shows a circuit diagram of the TES circuit 406, the FES circuit 408, and the data circuit 450. FES circuit 408 comprises a plurality of amplifiers 500, 502, 504, 506, 508 and 510 connected to detector sections 404A, B, E, F, C and D, respectively. A summing amplifier 520 is connected to amplifiers 500–506 and a summing amplifier 522 is connected to amplifiers 508 and 510. A differential amplifier 524 is connected to summing amplifiers 520 and 522 and generates the FES.

TES circuit 406 comprises a pair of summing amplifiers 530 and 532, and a differential amplifier 534. Amplifier 530 is connected to amplifiers 502, 506 and 510, and amplifier 532 is connected to amplifiers 500, 504 and 508. Differential amplifier 534 is connected to amplifiers 530 and 532 and generates a TES.

Data circuit 450 has a plurality of amplifiers 540, 542, 544 and 546 connected to detectors 436, 446, 438 and 448, respectively. A differential amplifier 550 is connected to amplifiers 540 and 542, and generates a data signal representative of the data detected by beam 22. A differential amplifier 552 is connected to amplifiers 544 and 546, and generates a data signal representative of the data detected by beam 32.

The operation of system 300 may now be understood. When it is desired to write data on disk 312, controller 460 causes laser control 464 to energize lasers 340 and 346 such that both beams 22 and 32 are produced and combine at hologram 12.

Beams 22 and 32 are then directed to the disk 312 as explained above. Beam 22 is of sufficient power to heat the MO material of disk 312 to a temperature above its Curie temperature. At this temperature the magnetic domains of the material may be oriented in an opposite direction by bias magnet 334. Typically, the domains of media 312 are oriented in an original direction and bias magnet 334 is used to reverse the domains of those spots which beam 22 heats above the Curie temperature. Controller 460 causes laser control 464 to pulse beam 22 responsive to the data to be recorded.

Disk 312 rotates and the spots just recorded by beam 22 pass under the DRAW beam 32. Beam 32 is at a lower power level than beam 22 and does not heat the material above the Curie temperature. The beam 382 has its plane of polarization rotated one way or the other depending upon the magnetic orientation of the recorded spots. This is known as the Kerr effect. In this way the DRAW beam 28 reads the data just written by beam 26. Reflected beam 380 and 382 return to the optical channel 328.

The DRAW servo beam 400 is completely blocked by the knife edge 402 such that only the R/W servo beam 398 is used to provide the servo signals for focussing and tracking. See FIG. 11. When beam 22 is exactly focussed on medium 312, beam 398 will have a circular cross-section 560 on detector 404. The sum of the amount of light hitting areas C and D will be approximately equal to the sum of the amount of light hitting areas A, B, E and F, and will cause circuit 408 to generate a zero focus error signal. If beam 22 is slightly out of focus one way or the other, beam 398 will have a circular cross-section 562 or 564 on detector 404. This change in circular cross-section causes circuit 408 to generate a positive or negative focus error signal. The focus error signal is used by the focus servo 412 to control motor 366 to move lens 362 until the focus is again achieved.

If beam 22 is focussed exactly on a track of medium 12, then beam 398 will fall as a circular cross-section 560 equally between the sections A, C and E, and the sections B, D and F. If beam 22 is off track, beam 398 will fall more on sections A, C and E, and less on sections B, D and F, or vice versa. This will result in a positive or negative tracking error signal being produced by circuit 406. This tracking error signal is then used by the track and seek servo 410 to control motor 326 to move head 322 until the beam is once again on track.

The DRAW data beams 434 and 444 are detected by detectors 438 and 448, respectively, and data circuit 450 generates a DRAW data signal which is representative of the recorded data. Controller 460 uses the signal to verify that the data just written was accurately recorded. During the write operation, the R/W data signal is ignored by controller 460.

During a read operation, controller 460 causes laser control 464 to energize only laser 340 such that only the R/W beam 22 is produced. The power of beam 22 is adjusted such that it does not heat the media of disk 312 above its Curie temperature. This low power beam 22 is reflected by the disk 312 as beam 380. The R/W data beams 432 and 442 are detected by detectors 436 and 446, respectively, and data circuit 450 generates a R/W data signal.

Figure 13:
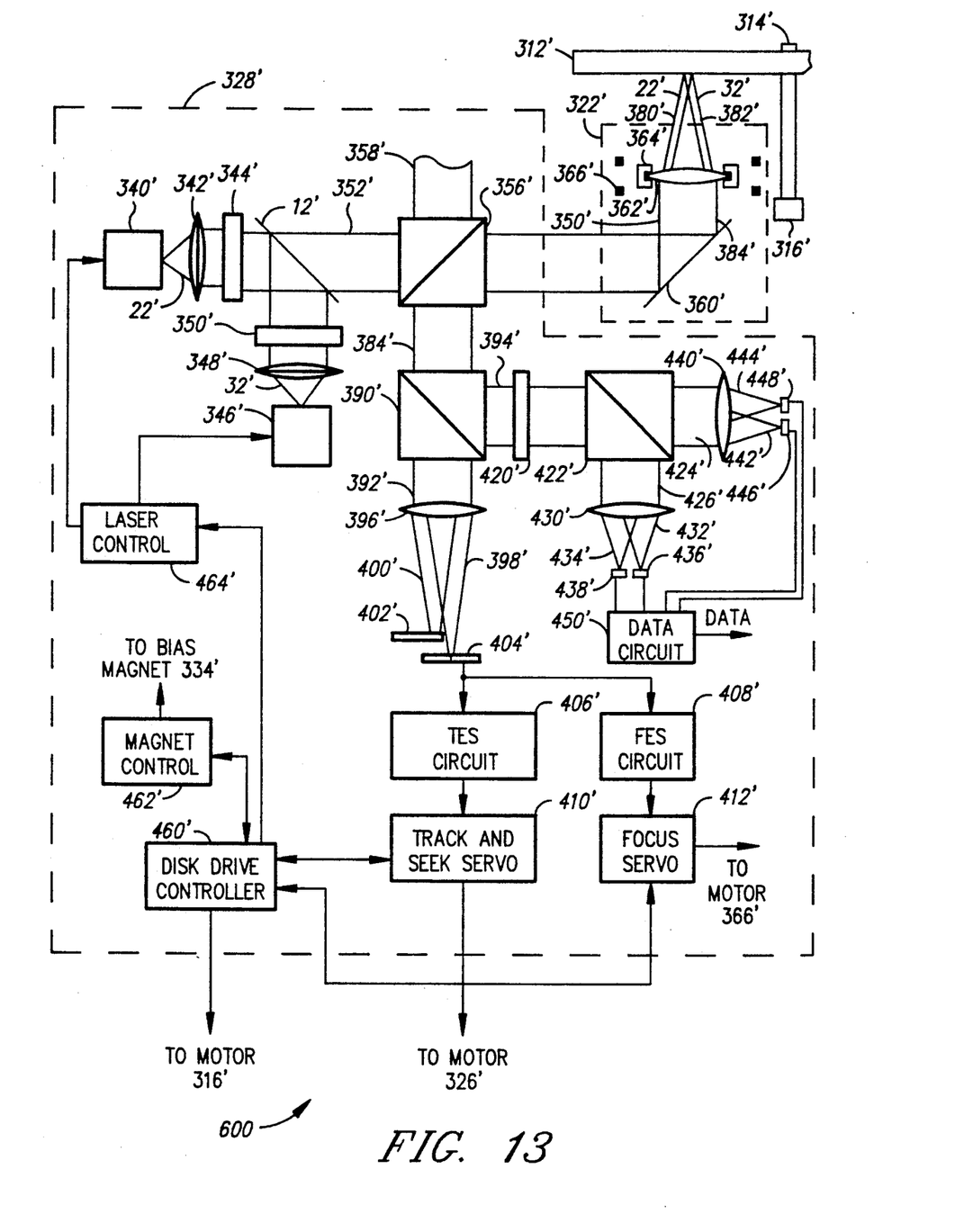
FIG. 13 is a schematic diagram of an alternative embodiment of an optical data storage system of the present invention.

FIG. 13 shows a schematic diagram of a parallel track optical data storage system of the present invention, and is designated by the general reference number 600. Elements of system 600 which are similar to elements of system 300 are designated by a prime number. Note that the optical channel 328' is oriented with respect to head 322' such that beams 22 and 32 are focussed on separate tracks of disk 312' at different radial positions. This allows two different tracks of disk 312' to be recorded or read at the same time. For illustration purposes, FIG. 13 shows optical channel 328' as being rotated 90° as compared with head 328 of FIG. 9. In actuality, the optical channel 328' only needs to be rotated slightly (5-10 degrees) in order to displace the second beam toward the adjacent track. Laser control 464' energizes both laser 340' or 346' to generate the laser beams 22' and 32' at a level of intensity needed for either recording or reading, as desired. Note also that detector 404' is rotated relative to the position shown for system 300. This is necessary to generate a proper TES.

Figure 14:
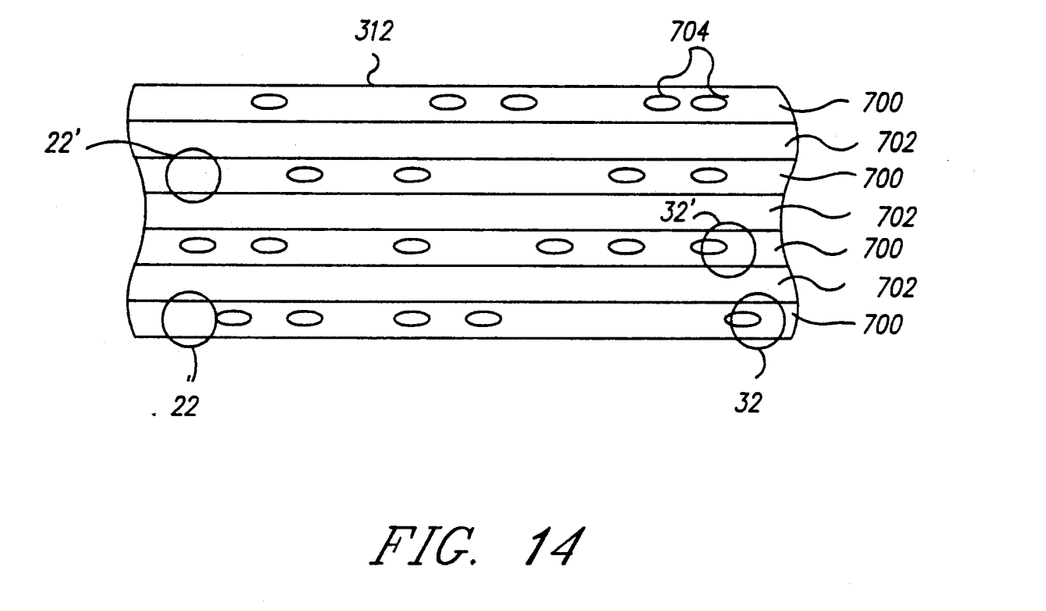
FIG. 14 is a top view of a portion of an optical data storage medium.

FIG. 14 shows a portion of disk 312 having concentric data tracks 700 and tracking grooves 702. The data tracks 700 contain recorded data spots or marks 704. Beams 22 and 32 of system 300, and beams 22' and 32' of system 600 are shown. In both cases the distance between the beam centers is approximately 15-20 microns.

While the invention has been particularly shown and described with reference to the preferred embodiments thereof, it will be understood by those skilled in the art for various other changes in form and details may be made without departing from the spirit and scope of the invention.

What is claimed is:

1. A hologram system comprising:
   a first radiation source for producing a first radiation beam;
   a second radiation source for producing a second radiation beam;
   a hologram element for receiving the first and second radiation beams at a first angle relative to one another and emitting the first and second radiation beams at a second angle relative to one another such that the first and second beams diverge, the second angle being less than the first angle;
   an optical data storage medium;
   an optical transmission means for directing the first and second radiation beams from the hologram element to separate locations on the medium; and
   an optical reception means for receiving a first and a second reflected light beam from the medium and generating a data signal responsive thereto.

2. The system of claim 1, wherein the hologram element is comprised of a single hologram which diffracts one of the first and second beams and allows the remaining beam to pass undiffracted.

3. The system of claim 1, wherein the hologram element is comprised of a hologram and a prism.

4. The system of claim 1, wherein the hologram element is comprised of a first and a second hologram, the first hologram diffracting only the first beam and the second hologram diffracting only the second beam.

5. The system of claim 1, wherein the first and second beams are directed to a track of the medium such that the first beam is used to write data and the second beam is used to perform direct read after write.

6. The system of claim 1, wherein the first and second beams are directed to separate tracks of the medium.

7. The system of claim 1, wherein the second angle is less than five degrees.

8. The system of claim 1, wherein the second angle is approximately one degree.

9. A hologram system comprising:
   a first radiation source for producing a first radiation beam;
   a second radiation source for producing a second radiation beam;
   a prism;
   a hologram element overlying the prism for receiving the first and second radiation beams, the first and second radiation beams incident at the hologram element at a first angle relative to one another, the first and second beams exiting the prism at a second angle relative to one another, the second angle being less than the first angle.

10. The system of claim 9, wherein the hologram element is comprised of a single hologram which diffracts one of the first and second beams and allows the remaining beam to pass undiffracted.

11. The system of claim 9, wherein the hologram element is comprised of a first and a second hologram, the first hologram diffracting only the first beam and the second hologram diffracting only the second beam.

12. The system of claim 9, wherein the second angle is less than five degrees.

13. The system of claim 9, wherein the second angle is approximately one degree.

14. A hologram system comprising:
a first radiation source for producing a first radiation beam;
a second radiation source for producing a second radiation beam; and
a hologram element for receiving the first and second radiation beams, the hologram element comprised of a first and a second hologram, the first hologram diffracting only the first beam and the second hologram diffracting only the second beam, the first and second radiation beams incident at the hologram element at a first angle relative to one another, the hologram element emitting the first and second beams at a second angle relative to one another, the second angle being less than the first angle.

15. The system of claim 14, wherein the second angle is less than five degrees.

16. The system of claim 14, wherein the second angle is approximately one degree.

* * * * *